Sept. 25, 1962  G. C. BARTON  3,055,056
PLASTIC INJECTION SOLE MOLDING MACHINES
Filed Dec. 4, 1959  10 Sheets-Sheet 1

Inventor
George C. Barton
By his Attorney

Sept. 25, 1962   G. C. BARTON   3,055,056
PLASTIC INJECTION SOLE MOLDING MACHINES
Filed Dec. 4, 1959   10 Sheets-Sheet 5
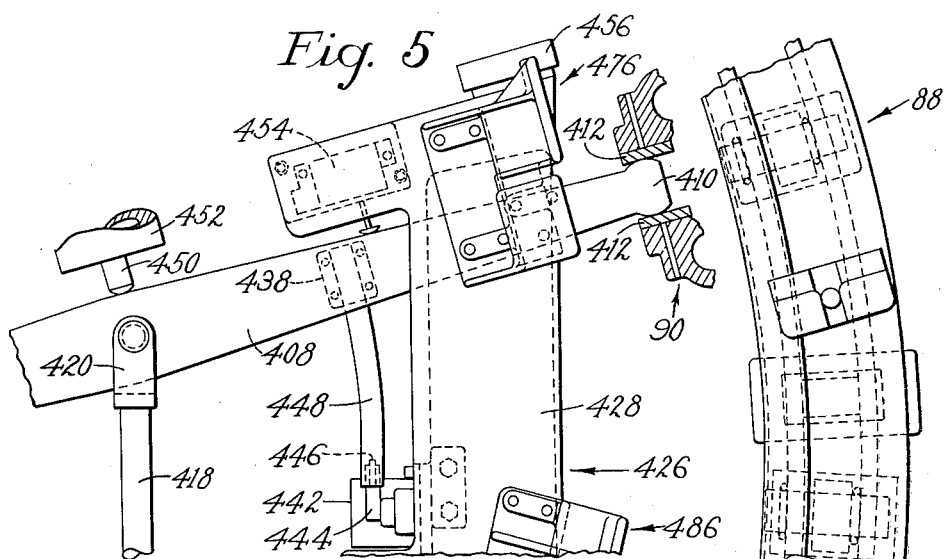
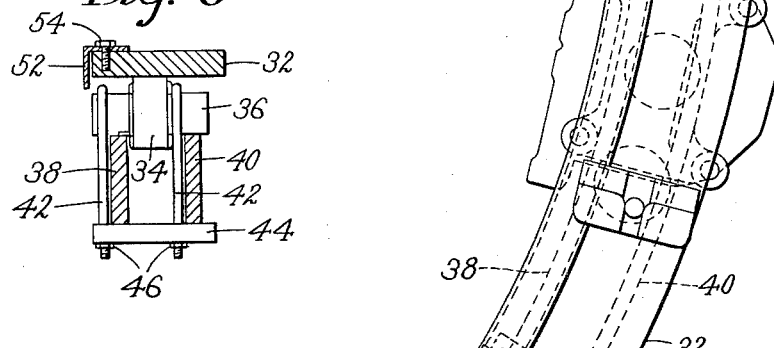
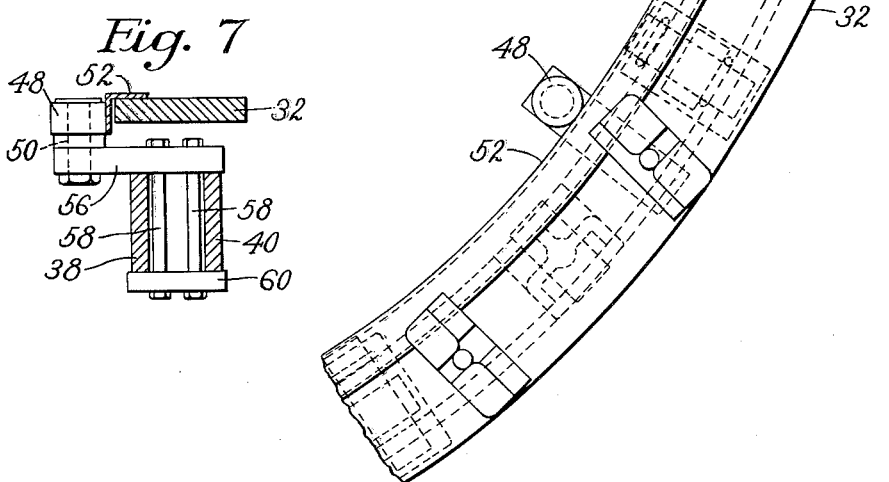

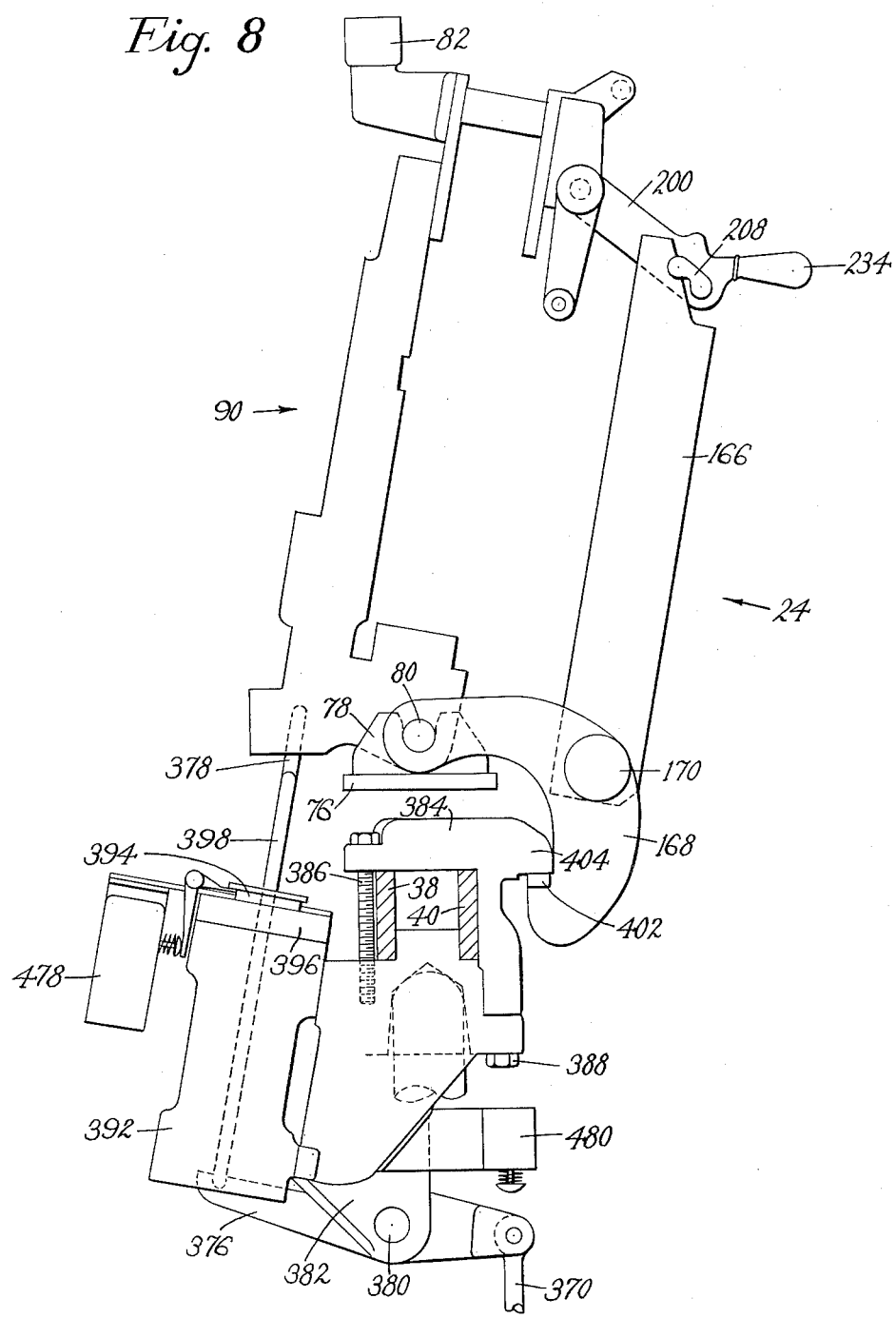

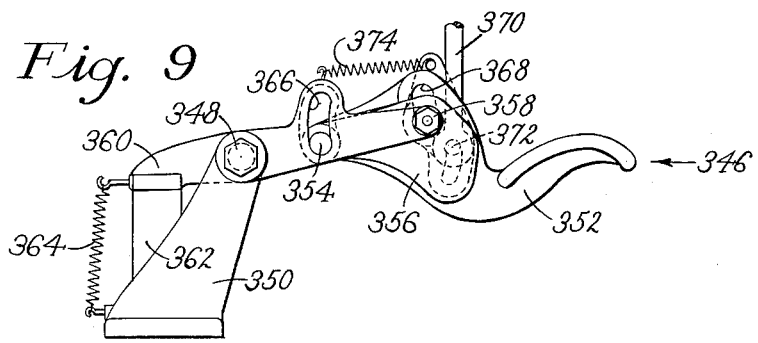
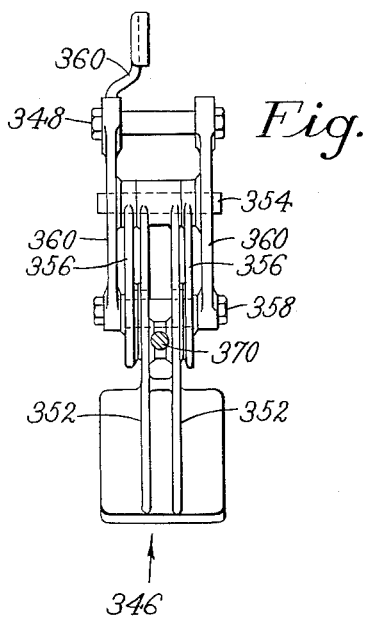
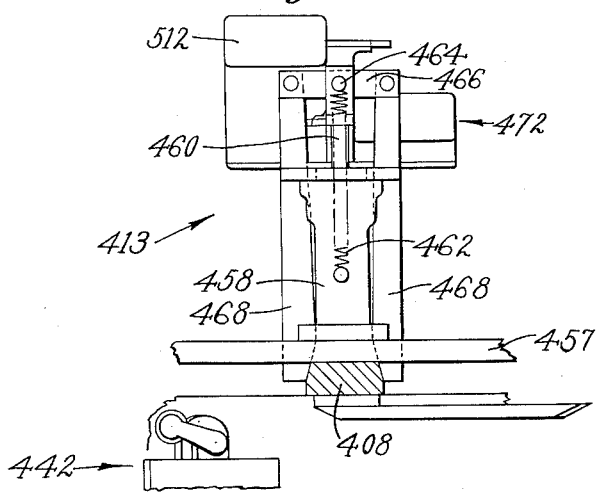

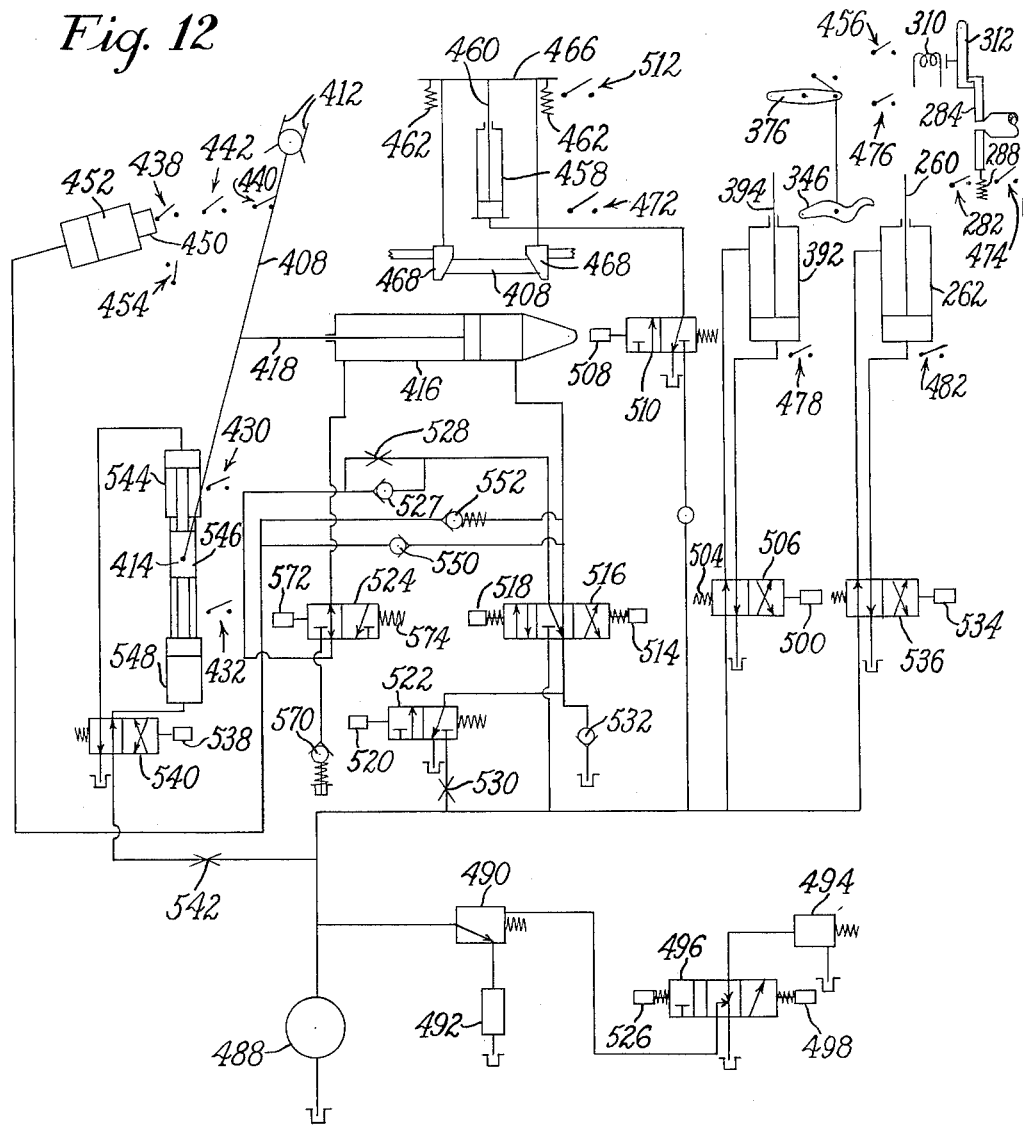

Sept. 25, 1962    G. C. BARTON    3,055,056
PLASTIC INJECTION SOLE MOLDING MACHINES
Filed Dec. 4, 1959    10 Sheets-Sheet 10

United States Patent Office 3,055,056
Patented Sept. 25, 1962

3,055,056
PLASTIC INJECTION SOLE MOLDING MACHINES
George Clifford Barton, Leicester, England, assignor to United Shoe Machinery Corporation, Boston, Mass., a corporation of New Jersey
Filed Dec. 4, 1959, Ser. No. 857,389
Claims priority, application Great Britain Dec. 27, 1958
4 Claims. (Cl. 18—30)

This invention relates to plastic injection molding machines, and is herein illustrated in its application to machines for molding and attaching sole and heel units to the bottoms of lasted shoe uppers. Machines of this type are disclosed in United States Letters Patent No. 2,937,-405, granted May 24, 1960, in the names of Berggren, Dorosz and Leahy, and in an application for United States Letters Patent Serial No. 766,105, filed October 8, 1958, in the names of Barton and Quarmby. While the invention is herein illustrated in its application to machines for molding and attaching sole and heel units to the bottoms of lasted shoe uppers, it is to be understood that the invention is not limited in scope to machines of this type but in certain aspects thereof is applicable generally to plastic injection molding machines.

It is the object of the present invention to improve machines of the type above referred to in order to provide increased facility of operation and a higher rate of production while at the same time providing a machine of simpler construction and more reliable operation.

Machines of the type illustrated in the Barton et al. application for United States Letters Patent above referred to are provided with a turret comprising a table mounted for rotation about a fixed axis and a plurality of ambulatory assemblies mounted on the table, each assembly comprising a pair of side mold members, a sole mold member and a shoe support movable relatively to the mold members to effect the closure of the mold cavity.

It is a further object of the present invention to provide, in a machine of the type disclosed in the Barton et al. application, an improved means for indexing the turret and determining the sequence of the indexing operations with relation to the other functions of the machine.

With the above and other objects in view, as will hereinafter appear, the present invention, in one aspect thereof, contemplates the provision in a machine of the type disclosed in the Barton et al. application of manually operated switch means which operates upon depression thereof to cause the closure of the side mold members, and upon release thereof, to cause the retraction of the mold closing means in order to provide clearance for the rotation of the turret. The retraction of the mold closing means closes a switch in the circuit of a solenoid, the operation of which initiates the indexing of the turret. During the indexing movement, the ambulatory assembly rides in a position in which it is outwardly offset from its mold charging position sufficiently to clear the mold charging instrumentalities as it enters the injection station. For moving the ambulatory assembly in the injection station into its mold charging position, an actuator herein illustrated as a pressure fluid actuated piston is provided, the operation of the piston being initiated by the operation of means herein illustrated as a microswitch by the indexing lever, the operation of said switch occurring at the point of completion of the indexing movement. The indexing movement is decelerated during the latter part of the cycle by suitable retarding means herein illustrated as a restriction in the hydraulic system for effecting the indexing operation. The restriction is rendered effective by means herein illustrated as a microswitch operated by the indexing lever. In the illustrated organization, the movement of the ambulatory assembly at the injection station into mold charging position closes a switch which initiates the operation of the mold charging means and which also effects the disengagement of the indexing lever from the turret. During the mold charging operation, the indexing lever is returned to the angular position from which the indexing movement began, such return movement of the lever being initiated by means operated by the movement of disengagement of the lever from the turret. In the illustrated organization, the return movement of the indexing lever causes the operation of means for effecting reengagement of the lever with the turret preparatory to the next succeeding indexing operation. The movement of reengagement of the indexing lever with the turret causes the operation of a locking means which engages the indexing lever thereby to hold the turret assembly against rotation while the operator removes a finished shoe from a shoe form in the loading station and places upon the shoe form a lasted shoe upper onto which a sole and heel unit is to be molded. In the illustrated organization, the indexing movement is initiated by the manual operation of suitable switch means herein illustrated as a pair of push buttons. The operation of the push buttons causes the withdrawal of the lever locking means and such withdrawal of the locking means operates a microswitch for initiating the indexing movement of the lever.

The closing of the side mold members in the illustrated machine is effected by the straightening of toggle mechanisms by the operation of a pressure fluid actuated piston and the opening of the side mold members is effected by the depression of a treadle. In order to facilitate the treadle operation, the present invention provides hand grip mechanisms which may be manipulated to operate means for breaking the toggles, said hand grip mechanisms also serving to facilitate manual transfer of the shoe support between its loading position and its mold closing position.

In order to provide for the clearance of sprue from the sole mold member, the present invention provides a sprue clearer positioned adjacent to the sole mold member and means operated by the rotation of the turret for moving the sprue clearer into a position in which the sprue carried thereby is discharged by gravity into a suitable receptacle.

Invention is also to be recognized in various combinations of the novel turret indexing means in its application to plastic injection molding machines generally.

These and other features of the invention will now be described with reference to the accompanying drawings and pointed out in the appended claims.

In the drawings,

FIG. 5 is a plan view similar to FIG. 4 showing the indexing means in a position different from that shown in FIG. 4;

FIG. 6 is a section taken on the line VI—VI of FIG. 4;

FIG. 7 is a section taken on the line VII—VII of FIG. 4;

FIG. 8 is a left side elevation of a mold assembly shown in the loading station, certain parts being broken away and other parts being shown in section;

FIG. 9 is a side elevation of a treadle mechanism operating at the loading station;

FIG. 10 is a bottom view of the treadle mechanism;

FIG. 11 is a detail view of the turret locking means;

FIG. 12 is a chart of the electric and hydraulic organizations;

Figure 1:
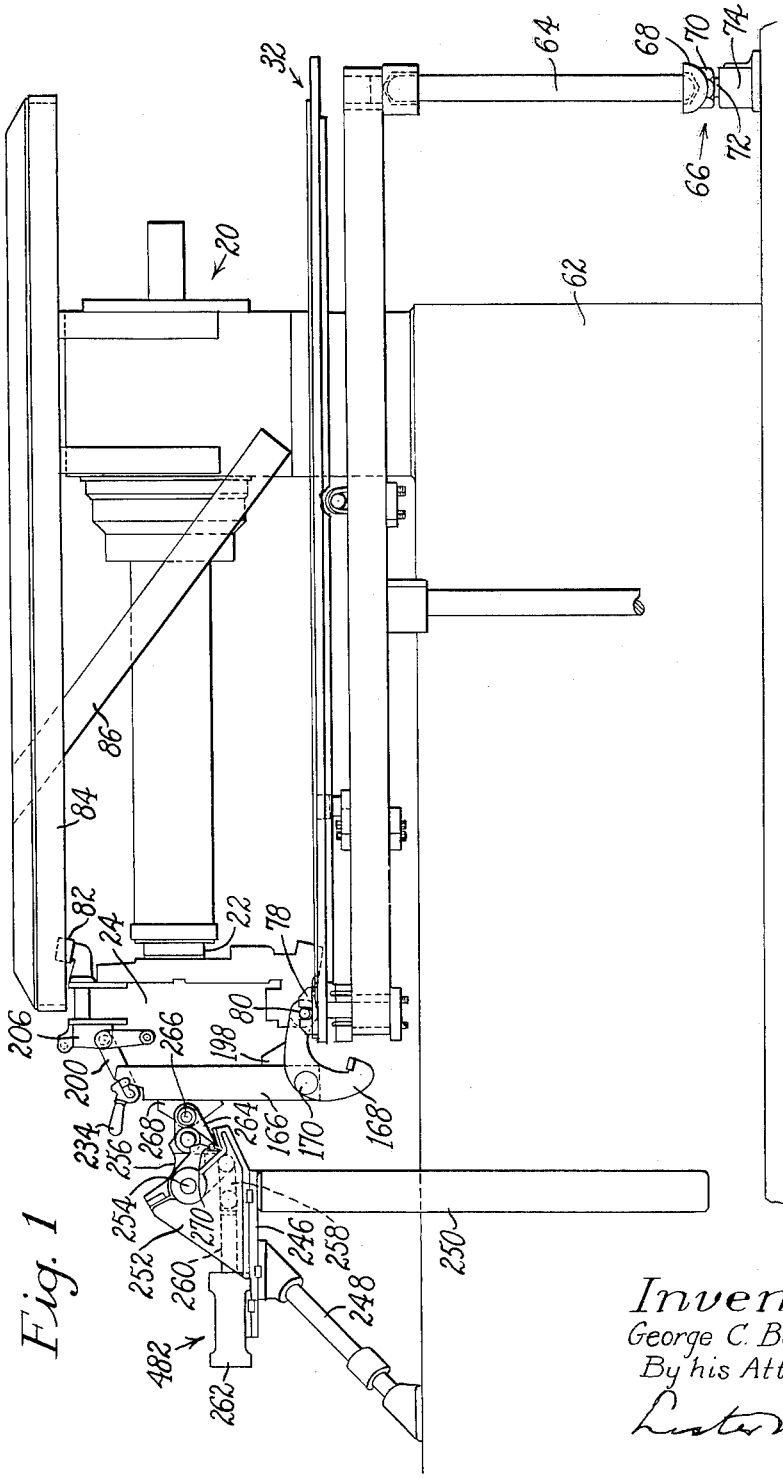
FIG. 1 is a side elevation of a machine embodying the features of the present invention, illustrating generally the turret, the injection head, and an ambulatory assembly on the turret in the injection station.

The machine illustrated in the drawings is a turret-type organization in which an annular table structure arranged in a horizontal plane rotates about a vertical axis around a plastic injecting means positioned within the space surrounded by the table. Positioned on the table and extending upwardly therefrom are 12 ambulatory assemblies uniformly spaced from each other, each assembly comprising a shoe form for receiving a lasted shoe, a pair of side mold members which close against the shoe on the form and a bottom mold member which, together with the side mold members and the shoe form, provide a closed cavity defining the shape of the sole and heel unit to be molded onto the shoe bottom. The turret is advanced in 12 steps to effect a complete rotation thereof. At a suitable position about the periphery of the turret a loading station is provided wherein a lasted shoe upper is mounted on the shoe form and the side mold members are closed to form the mold cavity. After the closing of the side mold members, the operator causes an indexing mechanism mounted in the space enclosed by the turret to advance the turret one step, thus advancing the mold assembly just closed into the injection station where the plastic injection means operates to charge the mold cavity. While the mold charging operation proceeds in the injection station a shoe whereon a sole and heel unit has been molded is removed from the shoe form in the loading station and a lasted shoe prepared for the soling operation is mounted on the shoe form and the side mold members are closed as above described. It will be understood that a new cycle of operations of the illustrated machine is begun with each indexing operation and by the same operation a cycle previously commenced is completed by the return of a shoe to the loading station. The duration of the cycle from the injection station through the remaining 330° of operation of the turret back to the loading station is sufficient to permit the fluid plastic injected into the mold cavity to solidify sufficiently to permit opening of the molds and the removal of the shoe from the shoe form with no likelihood of damage to the newly molded sole and heel unit in the handling of the shoe involved in the unloading operation.

Figure 2:
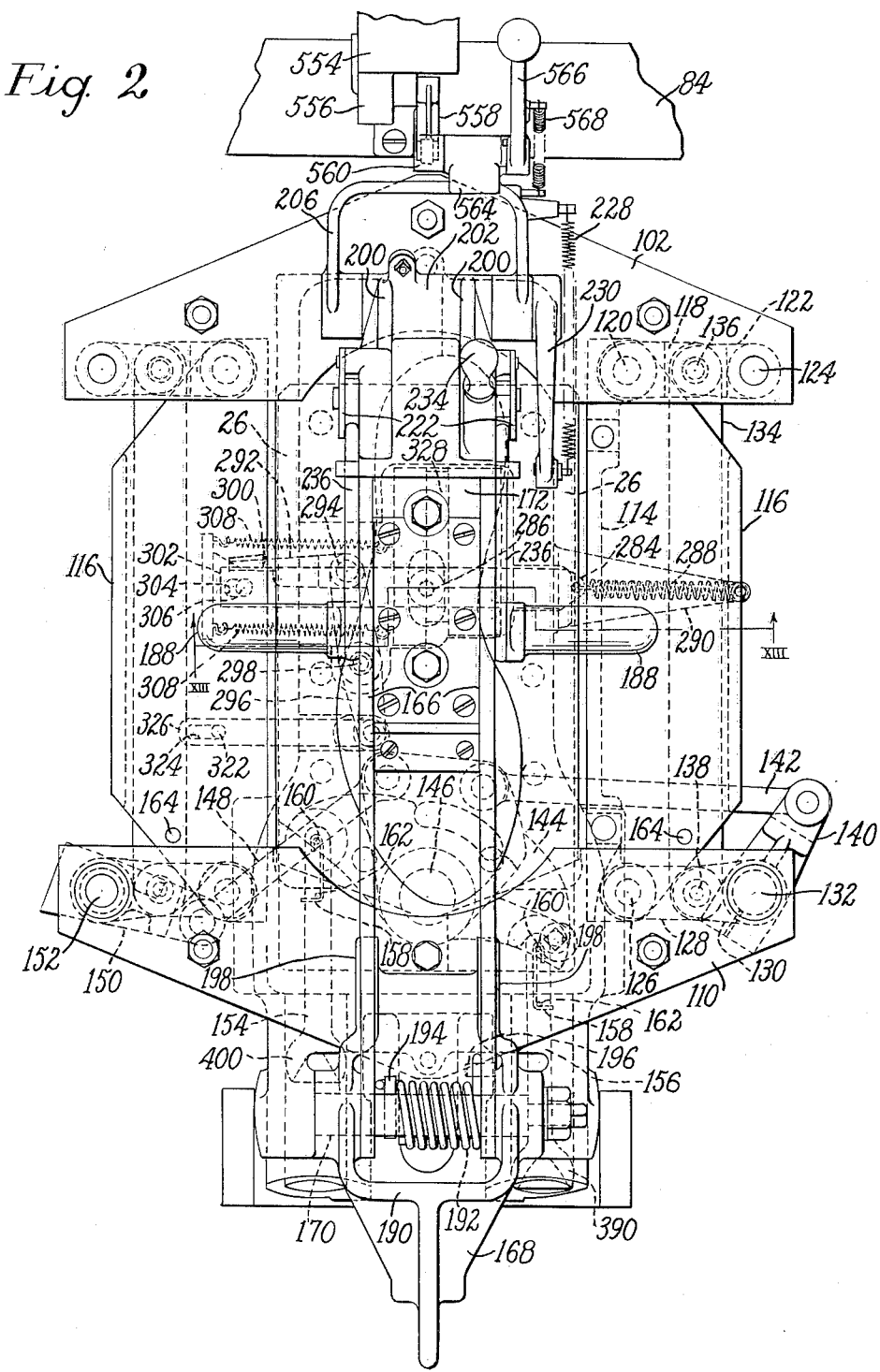
FIG. 2 is a front elevation of one of the mold assemblies with the side mold members in their closed position.
Figure 3:
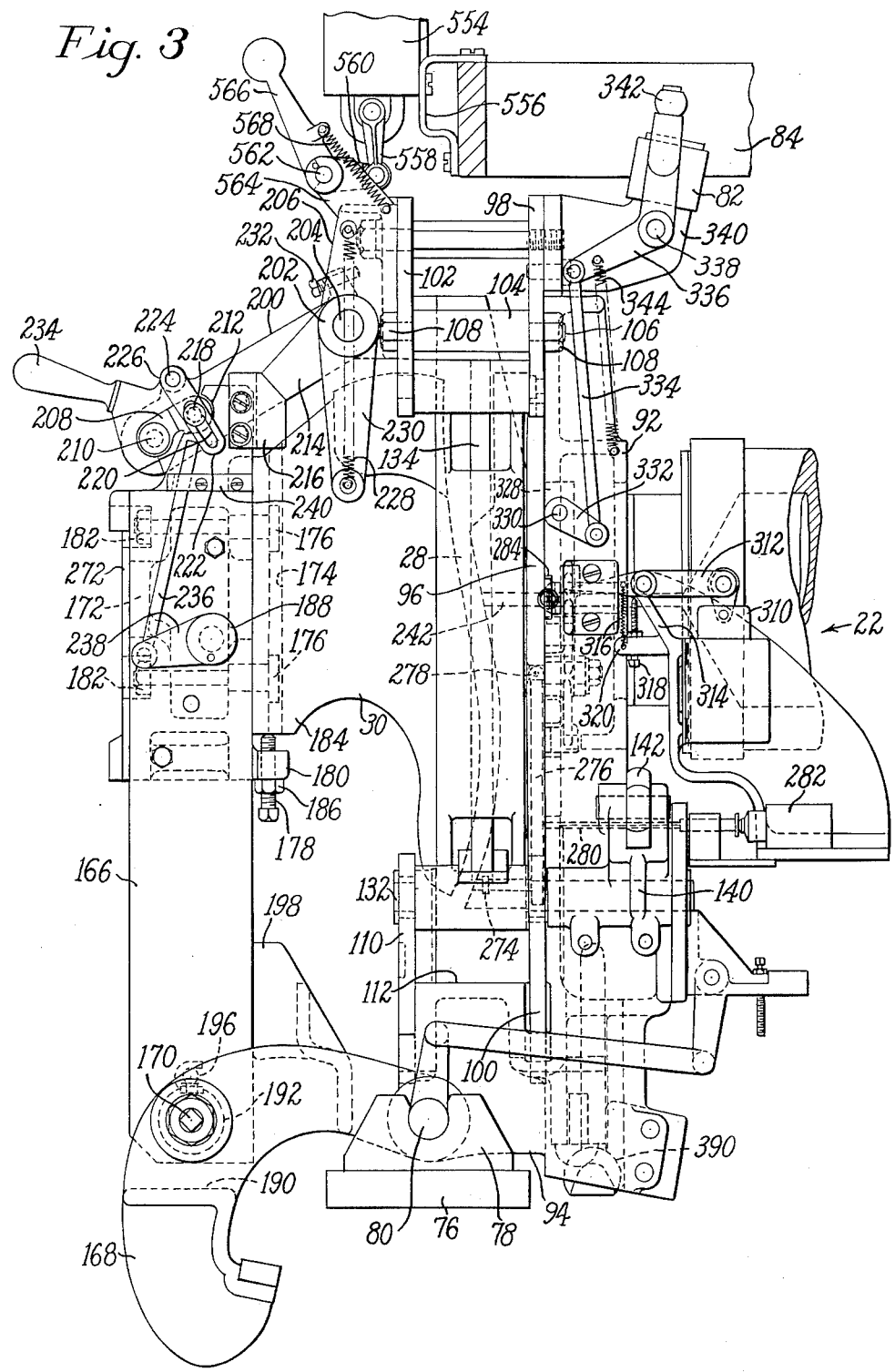
FIG. 3 is a right side elevation of the mold assembly shown in FIG. 2.

Referring to FIG. 1, the plastic injecting means is identified generally by the reference numeral 20 and has a nozzle assembly 22 through which thermoplastic material in a fluid state is injected into the mold cavity of a mold assembly identified generally by the reference numeral 24. Referring to FIG. 2, the side mold members common to the 12 ambulatory assemblies are identified by the reference numeral 26 and in FIG. 3 the sole mold member is identified by the reference numeral 28. The side mold members are mounted for movement toward each other into mold closing position and away from each other into mold opening position. The sole mold member 28 is fixed in the mold assembly and the side mold members 26, in their closed position, abut the edge face of the sole mold member. The shoe form is illustrated in FIG. 3 and identified by the reference numeral 30. In its operative or mold closing position, shown in FIG. 3, the shoe form is arranged with its bottom or sole surface facing away from an operator at the loading station, the toe end of the form pointing downwardly and the sole face being substantially vertical. After the completion of the molding cycle, the shoe form is swung forwardly and downwardly approximately 90° into a position facilitating the unloading therefrom of a shoe having a sole and heel unit molded thereon and the loading thereon of a lasted shoe prepared for the soling operation.

Referring to FIGS. 1 and 5, the illustrated turret comprises an annular table 32 arranged for rotation on a vertical axis about the injection means 20 and supported upon a plurality of rollers 34 (FIG. 6), preferably 16 in number and uniformly spaced along the length of the table. Each roller 34 is freely rotatable on a short shaft 36 which is supported on upright circular rails 38 and 40 concentric with the table 32 and secured thereon by a pair of U-shaped retaining rods 42. For anchoring each pair of retaining rods 42 a plate 44 is positioned against the bottom edge faces of the rails 38 and 40 and clamping nuts 46 are provided for anchoring the retaining rods to the plate. For determining the path of movement of the annular table 32, a plurality of guide rolls 48 (FIG. 7) are provided. Each roll 48 rotates freely upon a vertical stud 50 and engages the vertical surface of a rail 52 comprising a circular piece of angle iron, the horizontal portion of which is secured to the table 32 by headed screws 54 (FIG. 6). Each stud 50 extends upwardly from a plate 56 (FIG. 7) secured to the upper surfaces of the circular rails 38 and 40 by clamping bolts 58 anchored to suitable crossheads 60 which bear against the lower surfaces of the rails. The circular rails 38 and 40 are supported just above the top surface of a machine base 62 by supporting members secured to the base and by a plurality of posts 64 spaced at intervals along the length of the rails. Referring to FIG. 1, each post 64 is supported in a vertically adjustable pedestal identified generally by the reference numeral 66. Each pedestal comprises a cup 68 formed integrally with a base portion in the form of a nut 70 threaded onto a stem 72 projecting upwardly from a foot 74. The cup 68 is vertically adjustable on the stem 72 to level the turret assembly.

Fixed to the table 32 in each of the 12 stations is a plate 76 (FIG. 3), which mounts a pair of trunnions 78 in which is journaled a cross pin 80 which is disposed generally widthwise of and substantially beneath the foot form 30. The cross pin 80 establishes the axis of angular movement of the ambulatory assembly from its loading position in the loading station to its position of registration with the nozzle assembly 22 in the injection station. The loading position may also be characterized as the ambulatory position of the assembly, that is, the angular disposition of the assembly during the indexing movement of the turret. The ambulatory position of the assembly is determined by the engagement of a roll 82 carried by the mold assembly with the inner surface of a cylindrical guide rail 84 which is positioned substantially above the turret table 32 and is secured to a fixed element of the injection means and is further supported by a truss member 85 (FIG. 1). The angular position of each assembly during its movement with the turret table 32 is determined by the engagement of the roll 82 with the rail 84, the rail being so located that the sole mold member 28 clears the nozzle assembly 22 as the assembly advances into the injection station. When the rotation of the turret table 32 has advanced a given assembly into the injection station identified by the numeral 88 (FIG. 5), the assembly is swung rearwardly or in a clockwise direction, as seen in FIG. 3, about the axis defined by the cross pin 80, to cause the injection port formed in the sole mold member 28 to register with a nozzle element of the nozzle assembly 22 in preparation for the charging of the mold cavity. After the mold has been charged, the mold assembly is permitted to swing into a counterclockwise direction, as seen in FIG. 3, into a position in which the roll 82 again bears against the guide rail 84.

For supporting the mold elements and instrumentalities associated therewith, each mold assembly is provided with an L-shaped frame of channel construction, identified in FIG. 8 by the numeral 90. Referring to FIG. 3, the frame 90 has an elongated portion 92 which is upstanding, and a short portion 94 positioned beneath the shoe form 30, as seen in said figure. Secured to the front face of the elongated portion 92 is a central plate 96. Secured to the upper end of the elongated portion, in contiguous relation to the upper end of the plate 96, is a plate 98, and secured to the lower end of the elongated portion, in contiguous relation to the plate 96, is a plate 100. Cooperating with the plate 98 is a plate 102 which is suitably spaced from the plate 98 by cylindrical spacers, one of which is identified in FIG. 3 by the numeral 104. The plate 102 is fixed relatively to the plate 98 by tie rods 106 extending through the spacers and through the plates 98 and 102 and having clamping nuts 108 on their threaded end portions. Cooperating with plate 100 is a plate 110 which is secured to the base portion 94 of the frame member. The cross pin 80, on which the ambulatory assembly swings as a unit, is mounted in the forward portion of the base 94 of the L-frame member and extends outwardly in opposite directions therefrom into its bearings in the trunnions 78. The trunnions engage opposite side faces of the base 94 and thus hold the mold assembly against side play.

The short portion 94 of the L-frame member 90 is provided with a plane upper surface 112 which provides support for the side mold members 26 during their opening and closing movements. The side mold members are provided respectively with outwardly extending tongues 114 (FIG. 2) which are mounted in suitable grooves formed in mold carriers 116. The opening and closing of the side molds is effected by toggle mechanism. The carrier 116, at the right side of FIG. 2, is provided at its upper end with a toggle link 118 fulcrumed on a pin 120 mounted in the upper portion of the side mold carrier 116, a second toggle link 122 being fulcrumed on a pin 124 which is mounted in the plates 98 and 102. At its lower end the side mold carrier has mounted therein a pin 126 on which is fulcrumed a toggle link 128. A second toggle link 130 is fixed to a shaft 132 mounted in the bottom plates 100 and 110. The upper toggle links 116 and 122 are connected together and to a link 134 by a pin 136, and the lower toggle links 128 and 130 are connected to said link by a pin 138. In FIG. 2 the toggles are shown in their straightened condition with side mold members closed. The link 134 is moved downwardly to break the toggles and thus to impart opening movement to the right hand side mold member. The construction and operation of the side mold assembly, at the left in FIG. 2, will be understood from the above description. For advancing and retracting the side mold carriers 116, the shaft 132 has fixed thereto an arm 140 which is connected by means of a link 142 to a lever 144 fulcrumed on a central shaft 146 mounted in the upright portion 92 of the L-frame. The lever 144 is also connected by a link 148 to an arm 150 fixed to a shaft 152 corresponding to the shaft 132 at the right side of the mold assembly. Thus, it will be seen that the operation of the lever 144 causes equal and opposite movement of the side mold members, either toward or from each other as the case may be. For operating the lever 144 two plungers 154 and 156 are provided. Said plungers operate in suitable sockets formed in the lever 144 in which they are retained by means of clips 158, each clip being supported at its upper end on a pin 160 mounted in the lever 144 and having at its lower end a right angular extension engaging a pin 162 mounted in the plunger. The plungers 154 and 156 are guided for longitudinal movement in bores formed in the L-frame. Suitable means hereinafter described is provided for operating the plungers.

The sole mold member 28 is secured to the central plate 96 by suitable fastenings (not shown). In order to insure the proper position of the sole mold member relatively to the side mold members, the fastenings are mounted in oversized holes in the central plate to permit a limited movement of the sole mold member by the side mold members in their closing movement. In mounting the sole mold member, the fastenings remain slightly retracted from their clamping position while the side mold members are brought into position to effect the desired location of the side mold members, whereupon the fastenings are clamped against the central plate to secure the sole mold member in position. When the side mold members are removed from the mold assembly, preparatory to their replacement by other side mold members of a different size or style, the side mold carriers 116 are supported by the engagement of dowel pins 164 (FIG. 2), projecting in opposite directions from the carriers, with upper edge faces of the plates 100 and 110. When the side mold carriers have mold members secured thereto, the dowel pins 164 lie just above the upper edge faces of the plates and the side molds are supported by the engagement of their lower extremities with the plane horizontal surface 112 of the L-frame 90.

The illustrated shoe form 30 is mounted between a pair of side plates 166 which, as shown in FIGS. 2 and 3, extend upwardly from a bifurcated lever 168. As shown in FIG. 2, the lower end portions of the side plates are positioned between parallel arms of the lever 168 and are pivotally mounted on a cross pin 170 carried by the lever. As shown in FIG. 3, the parallel arms of the lever 168 extend rearwardly from the cross pin 170 and are pivotally mounted on the pin 80.

As shown in FIGS. 2 and 3, the upper portions of the side plates 166 are secured to a block 172 on which the shoe form 30 is carried. To provide for the mounting of the shoe form on the block, a longitudinal undercut groove 174 is formed therein to receive the heads of two clamping bolts 176 which extend forwardly through bores in the block 172. The longitudinal position of the shoe form, relatively to the mold members, is determined by an abutment screw 178 mounted in and projecting upwardly from a lug 180 extending rearwardly from the lower portion of the block 172. In positioning the shoe form the bolts 176 are left slack until the side mold members have been advanced against the shoe form to hold it in position, whereupon nuts 182 on the clamping bolts are tightened and the abutment screw 178 is advanced into engagement with an extension 184 of the shoe form 30 and is secured in position by a set screw 186. The operator moves the shoe supporting assembly manually between its loading station and its position of registration with the side mold members illustrated in FIGS. 2 and 3, suitable handles 188 being provided for this purpose. As shown in FIG. 2, the handles extend outwardly in opposite directions from the plates 166. The shoe supporting assembly moves from its position in FIG. 3 into its loading position by a compound swinging movement. During the first part of this movement the assembly swings upon the pin 80, this movement continuing until the lever 168 is arrested by its engagement with the plate 76. Thereafter, the shoe supporting assembly swings upon the cross pin 170 until the side plates 166 come into a substantially horizontal position in which they are supported upon a crosshead 190 formed in the lever 168. A torsion spring 192, surrounding the cross pin 170, exerts an upward pressure on the shoe supporting assembly to facilitate the lifting of the assembly into its position illustrated in FIG. 3. As shown in FIG. 2, one end of spring 192 engages a pin 194 projecting upwardly from the cross pin 170 and the other end engages a pin 196 mounted in and projecting inwardly from the right hand side plate 166. The position of the shoe form 30 heightwise thereof, relatively to the mold members, is determined by the engagement of the side plates 166 with abutment members 198 projecting upwardly from the parallel arms of the lever 168. As shown in FIG. 2, the upper portions of the abutment members are offset inwardly to register with the side plates 166. The angular position of the lever 168 with the shoe form in its position shown in FIG. 3 is determined by means hereinafter described. The mounting organization of the shoe form assembly is such that as the shoe form is moved forwardly away from the mold members it moves substantially horizontally until the sole and heel unit, which has just been molded onto the shoe bottom, has moved forwardly from the mold members.

For holding the shoe form 30 against the plastic injecting pressure during the mold charging operation, a suitable latch mechanism is provided. Referring to FIG. 3, a latch member, comprising a pair of parallel arms 200 having a common hub 202, is secured to a cross shaft 204, mounted in bearings in a bracket 206, secured to the plate 102. As shown in FIG. 2, the width of the rear portion of the latch member corresponds to the space between the plates 166, but the forward portions of said arms 200 are increased in thickness to provide portions registering with the plates 166. Referring to FIG. 3, there is mounted in a semicircular recess, formed in each of these enlarged portions, a thrust member 208 pivotally mounted on a stud 210 extending outwardly from the arms 200. A downward movement of the latch member brings the free end portions of the thrust members into engagement with semicircular bearing surfaces 212 formed in the upper portions of the plates 166. The rearward movement of the shoe form assembly by the thrust members is arrested by suitable abutment members 214, herein illustrated as bosses formed in and extending outwardly from the arms 200. The abutment members are engaged by angular rear edge faces of plates 216 secured to the upper portions of the plates 166. In order to limit the swinging movements of the thrust members 208, their free end portions are provided with outwardly extending studs 218 which are received within slots 220, extending longitudinally of links 222, and pivotally mounted on studs 224, extending outwardly from ears 226, extending upwardly from the arms 200. During the upward movement of the latch assembly, the thrust members swing downwardly by gravity into a position in which the studs 218 engage the lower ends of the slots 220. During the downward movement of the latch assembly, the free ends of the thrust members engage the bearing surfaces 212 and urge the shoe form assembly rearwardly or in a clockwise direction, as seen in FIG. 3, by a toggle-like action, thus bringing the plates 216 into engagement with the abutment members 214, as shown in FIG. 3. For yieldingly holding the latch assembly in its latching position illustrated in FIG. 3 or in its retracted position, a pair of tension springs is provided, one of which is illustrated in FIG. 3 and identified by the numeral 228. At its upper end the spring is anchored to a pin projecting outwardly from the bracket 206 and at its lower end to a pin projecting outwardly from an arm 230 fixed to the cross shaft 204. The arm 230 is so located that when the latching assembly is in its latching position, illustrated in FIG. 3, the spring has passed beyond its dead center position and restrains the latch assembly against retracting movement. The tension of the springs is adequate to support the weight of the latching assembly in its retracted position, which position is determined by the engagement of a stop screw 232 with the bracket 206. To facilitate the manipulation of the latch assembly, a suitable handle 234 is provided on one of the arms 200.

The pressure developed by the plastic injection means in the charging of the mold cavity is taken by the thrust members 208 and this pressure should preferably be relieved to an extent to facilitate the manual return of the latching assembly to its retracted position. In the illustrated organization, the pressure against the thrust members is relieved by the exertion of a rearward force against the handles 188 by the operator, followed by a turning of the handles in a clockwise direction as seen in FIG. 3, thereby to cause a pair of thrust members or push rods 236 to dislodge the thrust members 208 from their locking position illustrated in FIG. 3. Each push rod 236 is pivotally mounted on an arm 238 secured to and extending forwardly from the handle 188. At its upper end portion the push rod extends through a notch in a guide member 240 secured to the plate 166. It will be seen that clockwise movement of the handle 188 causes the push rod to move upwardly into engagement with the thrust member 208, thereby dislodging the thrust member from its position illustrated in FIG. 3 and facilitating the retraction of the latching assembly. After the retraction of the latching assembly, the shoe form assembly, with the completed shoe mounted thereon, may be swung manually in a counterclockwise direction, as seen in FIG. 3, into its loading position.

The ambulatory assembly comprising the mold organization and work supporting means is swung rearwardly as a unit to bring an injection port 242 into mating engagement with the nozzle of the plastic injecting organization. The injection port 242 extends through the sole mold member 28, the central plate 96 and the L-frame 90. For swinging the ambulatory assembly rearwardly, the illustrated machine is provided with a power operated toggle mechanism, illustrated in FIG. 1. The toggle mechanism is mounted on a platform 246 supported by legs 248 and 250. Secured to the platform 246 is a casting 252 having incorporated therein bearings for a cross shaft 254 in the forward end portion of a toggle link 256 which is substantially triangular in shape, as seen in FIG. 1. At the apex of its lower portion the toggle link is connected by a link 258 to a piston rod 260. The piston rod is connected to a piston operating in a cylinder 262 secured to the platform. Cooperating with the toggle link 256 is a toggle link 264 comprising a pair of spaced parallel triangular plates which are pivotally connected by a pin 266 to a thrust member or block 268. The straightening movement of the toggle links is restricted by the engagement of a pin 270 extending laterally from one of the plates comprising the toggle 264 with a surface of the casting 252. When the turret is operated to advance an ambulatory assembly into the injection station, the toggle 256, 264 is broken and the thrust member 268 is in a position slightly offset from the ambulatory assembly, but close enough thereto to be advanced into engagement with a thrust plate 272 (FIG. 3) secured to the shoe supporting assembly by the operation of the piston in the cylinder 262. The thrust member 268 swings the ambulatory assembly in a clockwise direction, as seen in FIG. 3, about the pin 80, thus bringing the injection port 242 into mating engagement with the nozzle preparatory to the charging of the mold cavity. The toggle links come into their straightened positions as the injection port engages the nozzle and positively holds the ambulatory assembly against retraction during the mold charging operation.

The operation of the plastic injecting means is terminated by the rearward movement of a plunger 274 (FIG. 3) which is operated by the pressure of the plastic in the mold cavity. The construction and operation of the plunger are illustrated and described in an application for United States Letters Patent Serial No. 807,230, filed April 17, 1959, now Patent No. 2,988,779 in the names of George C. Barton et al. The illustrated plunger is mounted in the toe end portion of the sole mold member 28 and arranged to operate a lever 276 fulcrumed at 278 within a slot in the plate 96, said lever, in turn, operating a plunger 280, the headed rear end portion of which engages and operates a microswitch 282. The operation of the microswitch 282 initiates the closing of a gate valve to shut off the injection port. Referring to FIG. 2, the illustrated gate valve comprises a plate 284 slidably mounted in the L-frame 90 and provided with an aperture 286 which is in alinement with the injection port during the mold charging operation. The gate valve is normally held closed by a spring 288, one end of which is anchored to the plate 284 and the other end to a bracket 290 secured to the L-frame. For holding the gate valve in its open position illustrated in FIG. 2, a latch member or arm 292 is pivotally mounted on a pin 294 at the upper end of a lever 296 pivotally mounted on a pin 298 fixed in the L-frame. The latch member engages a shoulder 300 projecting upwardly from a slide plate 302 arranged parallel and contiguous to the gate valve 284. The plate 302 is provided with a longitudinal slot 304 which receives a pin 306 projecting forwardly from the gate valve 284. A pair of springs 308 urge the plate 302 to the right, as seen in FIG. 2, said springs being anchored at their left ends to a crosshead in the left end portion of the plate 302, and at their right ends to two hooks mounted in the L-frame. The operation of the microswitch 282 (FIG. 3) energizes a solenoid 310 to effect clockwise movement of a trip lever 312 pivotally mounted on a bracket 314 incorporated in the injection assembly. The trip lever is normally held at the limit of its counterclockwise movement by a spring 316, this position being determined by the engagement of the trip lever with a stop screw 318 mounted in an extension 320 of the bracket 314. The operation of the solenoid 310 swings the trip lever 312 in a clockwise direction, as seen in FIG. 3, releasing the plate 302 to the operation of the springs 308 and releasing the gate valve 284 to the operation of the spring 288. The combined operation of the three springs shifts the gate valve 284 to the right, as seen in FIG. 2, and closes the injection port 242. The gate valve 284 is moved to the left to open the injection port by the operation of the left side mold carrier 116. To this end the side mold carrier has a pin 322 extending forwardly therefrom into a longitudinal slot 324 in the left end portion of a link 326, the right end portion of which is pivotally connected to the lower end of the lever 296. During the opening movement of the side mold carrier, the pin 322 engages the left end wall of the slot 324 and moves the link 326 to the left to impart clockwise movement to the lever 296, thereby bringing the latch arm 292 into latching position. The slot 324 is long enough so that the side mold carrier closes without disturbing the link 326.

In the operation of the illustrated machine, a short length of sprue is formed in between the gate valve 284 and the injection nozzle. This space is occupied by a sprue clearing lever 328 which has a semicylindrical recess in which the sprue is formed. The construction of the lever is disclosed in the Barton et al. application hereinbefore referred to. At an appropriate time in the machine cycle the sprue clearing lever is swung in a counterclockwise direction, as seen in FIG. 3, disengaging the sprue from the gate valve and causing it to fall into a suitable receptacle. As shown in FIG. 3, the clearing lever is secured to a pin 330 in the L-frame 90. Also secured to the pin 330 is an arm 332 which is connected by a link 334 to one arm of a bell crank lever 336 fulcrumed on a pin 338 which is carried by a bracket 340 fixed to the plate 98. At its upper end, the bell crank lever carries a roll 342. During the rotation of the turret assembly the roll 342 engages a fixed cam (not shown) which causes the lever 336 to swing in a clockwise direction, as seen in FIG. 3, to operate the sprue clearing lever 328. After the roll 342 passes clear of the cam, a spring 344 swings the bell crank lever 336 in a counterclockwise direction to return the sprue clearing lever 328 to its position illustrated in FIG. 3.

At the loading station there is provided manually operable means for moving the side mold carriers away from each other, thereby to open the side molds preparatory to the movement of the shoe form assembly downwardly into a position facilitating the removal of a completed shoe on the shoe form 30 and the loading thereon of a lasted shoe on which a sole is to be molded. The mold opening operation is effected by the depression of a treadle 346 (FIG. 9) pivotally mounted on a cross pin 348 fixed in a floor bracket 350. The illustrated treadle is a compound structure comprising a lever 352 which, as shown in FIG. 10, is in the form of a pair of parallel arms carrying a tread member at their forward ends. The lever 352 is fulcrumed on a cross pin 354 mounted in the parallel arms of a lever 356 which, in turn, are pivotally mounted on a cross pin 358 mounted in the forward portions of the parallel arms of a lever 360, one of which is extended rearwardly for engagement with an abutment member 362 which determines the elevated or retracted position of the treadle. The treadle is normally held retracted by a spring 364, the lower end of which is anchored to the floor bracket 350 and the upper end to a hook carried by the lever 360. The cross pin 354 extends into two arcuate slots 366 formed in the two arms of the lever 360, these slots being concentric with the fulcrum defined by the cross pin 358. The pin 358 extends through arcuate slots 368 formed in the parallel arms of the lever 352, these slots being concentric to the axis defined by the cross pin 354. A link or treadle rod 370 is pivotally mounted at its lower end on a pin 372 carried by the lever 352. One arm of the lever 356 has an upward extension which provides an anchorage for the forward end of a spring 374, the rear end of which is anchored to a hook carried by the lever 360. Referring to FIG. 8, the upper end portion of the treadle rod 370 is pivotally connected to the bifurcated forward end portion of a lever 376 which imparts upward movement to a thrust member, herein illustrated as a rod 378, freely mounted for longitudinal movement in a bracket secured to the machine frame. The lever 376 is fulcrumed on a pin 380 mounted in a bracket 382 which is clamped by means of an angular member 384 to the rails 38 and 40 at the loading station, the bracket and the angular member being connected together by suitable clamping screws 386 and 388. The assembly above described is supported by one of the posts 64 (FIG. 1).

In FIG. 8 the parts are shown in the positions they occupy when the treadle 346 has been depressed to elevate the thrust member 378. When the treadle is retracted the thrust member 378 is at the limit of its downward movement with its upper extremity clear of the L-frame 90, thus permitting the movement of the ambulatory assembly into the injection station. The depression of the treadle 346 raises the thrust member 378 and causes its upper extremity to enter a socket formed in a head 390 (FIG. 2) at the lower end of the plunger 156. Further depression of the treadle elevates the plunger, thus swinging the lever 144 in a counterclockwise direction, as seen in FIG. 2, to break the toggles and retract the side mold members. The initial operation of the treadle 346 to advance the thrust members 378 upwardly into engagement with the head 390 requires only a minimum of energy. For this purpose, the treadle lever 352 swings upon the cross pin 354 relatively to the levers 356 and 360 which at that time are held in their positions shown in FIG. 9 by the spring 364. When the thrust member 378 engages the head 390 a relatively strong force is required to break the toggles which hold the side mold members closed and, after the toggles have been broken, a lesser force is sufficient to complete the retraction of the side mold members. When heavy resistance is met by the thrust member 378, the treadle lever 352 fulcrums on the cross pin 358, thus exerting a maximum leverage upon the treadle rod 370, the cross pin 354 moving upwardly through the slot 366. After the toggles have been broken, the treadle assembly fulcrums as a unit on the cross pin 348 against the tension of the spring 364 to complete the retracting movements of the side mold members. The side mold members are closed by the fluid pressure operation of a piston mounted in a cylinder 392 (FIG. 8)

secured to the bracket 382. The piston has a tubular member 394 extending upwardly therefrom and through a suitable bore in the head 396 of the cylinder. The piston is moved upward by the application of fluid pressure to its lower portion. Mounted in the tubular member is a thrust member 398 which is oriented therein by light springs (not shown) which permit the upper end portion of the thrust member to adjust itself to a socket formed in a head 400 (FIG. 2) at the lower end of the plunger 154. The upward movement of the plunger by the thrust member swings the lever 144 in a clockwise direction, as seen in FIG. 2, to straighten the toggles, thereby advancing the side mold members into their closed position. The piston, together with the thrust member 398, are then retracted to permit the ambulatory assembly to advance from the loading station to the injection station. In order to hold the ambulatory assembly against upward movement by either of the two thrust members, the lever 168 is provided with a hardened striker plate 402 arranged to engage the bottom surface of an extension 404 of the angle piece 384.

Figure 4:
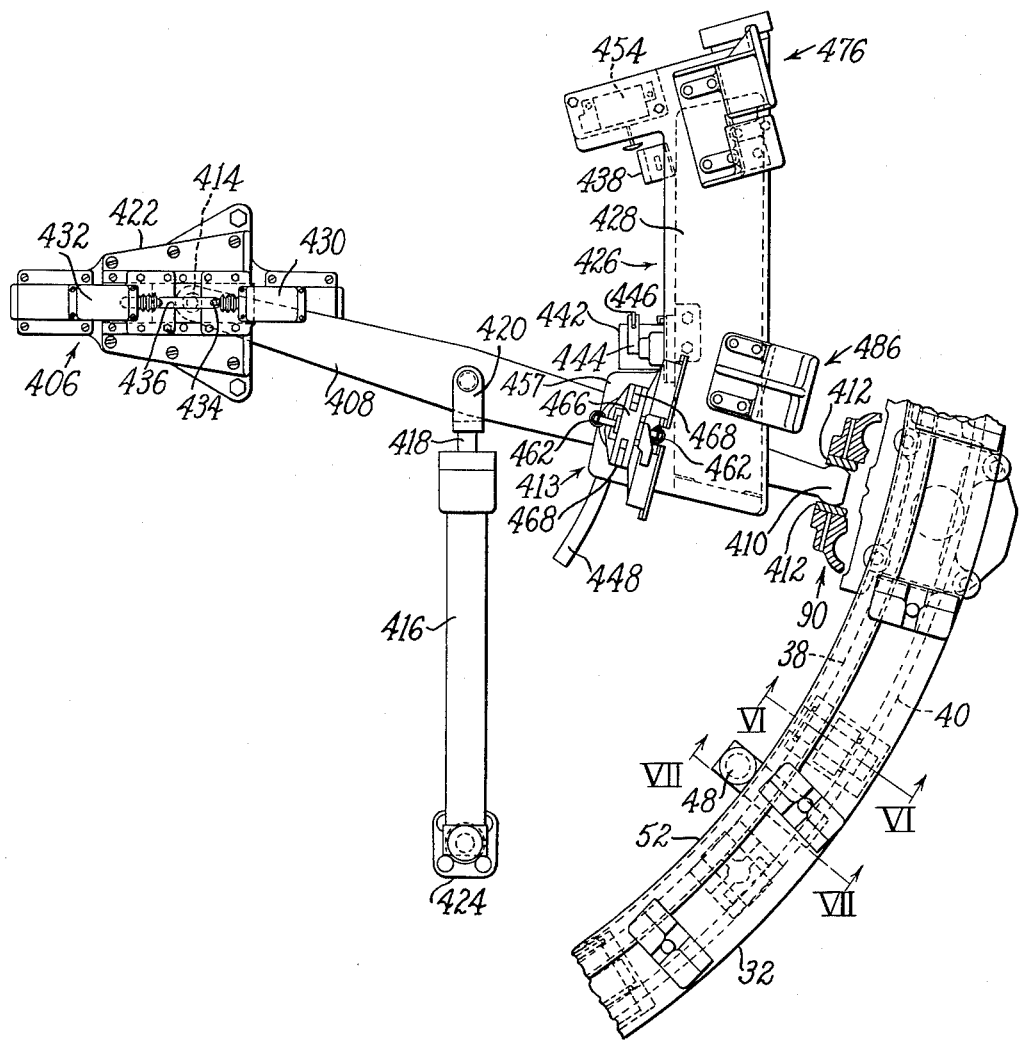
FIG. 4 is a plan view illustrating the indexing means for moving the turret step by step to transfer the mold assemblies from station to station in the performance of the operating cycle.
Figure 13:
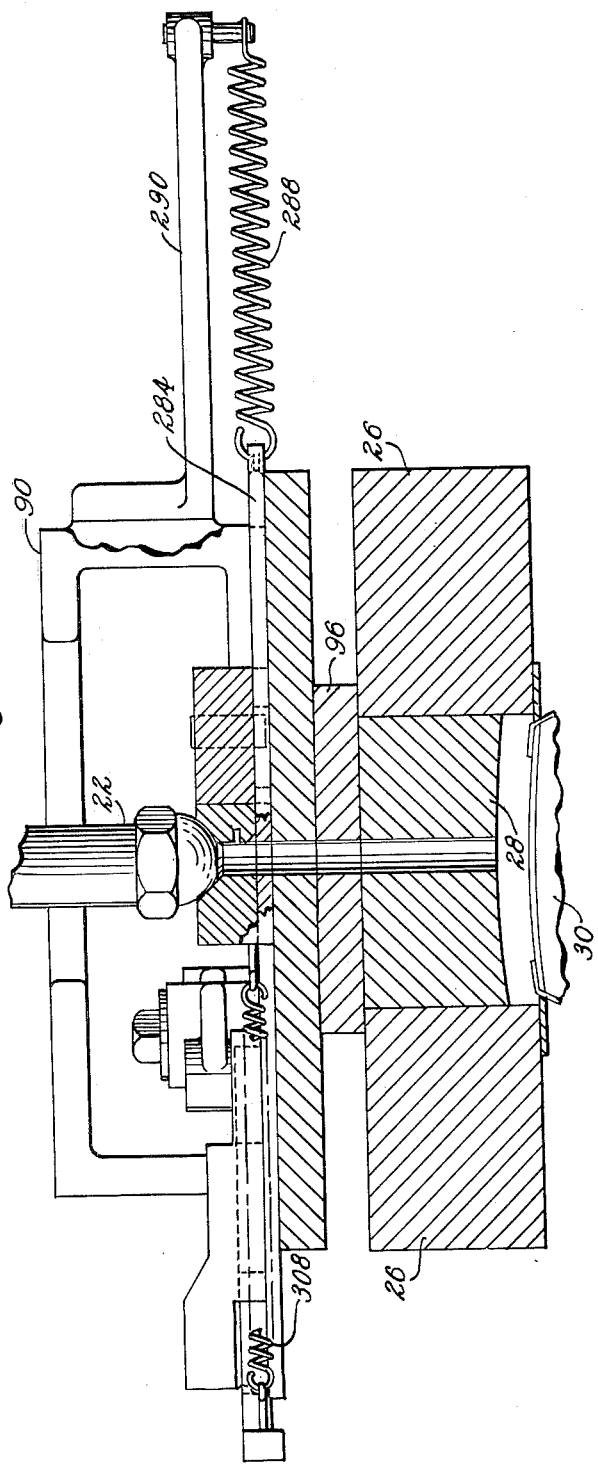
FIG. 13 is a section taken on the line XIII—XIII of FIG. 2.
Figure 14:
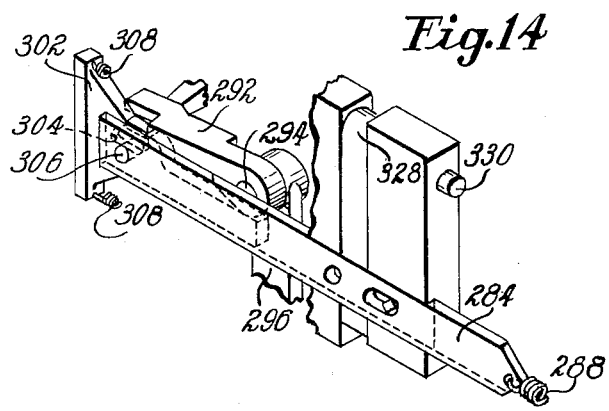
FIG. 14 is a perspective view illustrating certain operating parts partially shown in FIG. 13.
Figure 15:
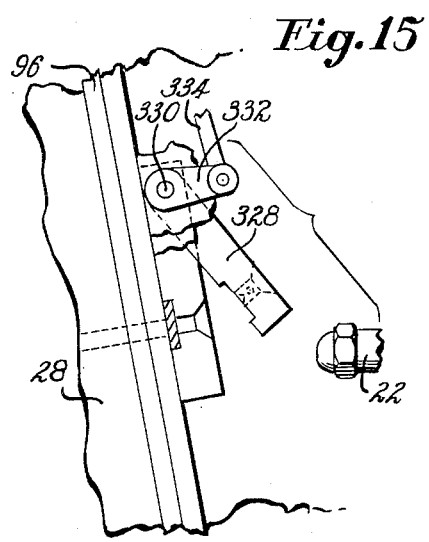
FIG. 15 is a detail view in side elevation illustrating, particularly, parts of the sprue clearing mechanism.

Referring to FIG. 4, for indexing of the turret, which comprises the table 34, and to the 12 ambulatory assemblies mounted thereon, a suitable piston is mounted in a cylinder 406 which is connected to a source of pressure fluid. Said piston imparts generally longitudinal movement to a lever 408 to and from a position in which the truncated spherical end portion 410 of the lever is positioned between wear plates 412 in the lower portion of the L-frame 90. For swinging the lever 408 in a counterclockwise direction, as seen in FIG. 4, about its fulcrum 414 to index the turret assembly by an increment of 30° a piston mounted in the cylinder 416 is provided with a piston rod 418 having a bifurcated head 420 which is pivotally connected to the lever 408 substantially midway between its ends. During such movement of the lever 408 its fulcrum is concentric to the axis of the turret. The two cylinders 406 and 416 are mounted on the machine base 62, the former being incorporated in a casting 422 and the latter being pivotally mounted at its rear end portion on a bracket 424. For guiding and supporting the right end portion of the lever 408, a flat horizontal table 426 is mounted on the machine base. A suitable cover plate 428 is secured to suitable spacers on the table 426 and overlies the upper surface of the lever. The application of fluid pressure to the piston in the cylinder 416 swings the lever 408 in a counterclockwise direction, as seen in FIG. 4, to index the turret assembly, the lever swinging from its position in FIG. 4 to its position illustrated in FIG. 5. After the completion of the indexing operation, pressure fluid enters the right hand portion of the cylinder 406 to move the piston therein to the left in order to retract the truncated spherical end portion 410 of the lever from the L-frame 90, whereupon pressure fluid enters the forward end portion of the cylinder 416 thereby swinging the lever 408 in a clockwise direction back to its initial position.

The sequence of operation of the fluid pressure operated instrumentalities is determined by a number of microswitches which are operated by various moving parts of the machine. Two microswitches 430 and 432 (FIG. 4) of the push button type determine respectively the advanced and retracted positions of the lever 408. For operating each of these switches, a pin 434 projects upwardly from the piston assembly through a slot 436 in the casting 422. In the normal operation of the machine the indexing movement of the turret assembly is terminated by a microswitch 438 upon the completion of 30° of movement of the turret assembly. The microswitch 438 is operated by the lever 408 as it moves into vertical alinement with the microswitch and into engagement with a switch operating element. A microswitch 440, illustrated in FIG. 12, but concealed in FIG. 4, operates in the same manner as the switch 438 to terminate the return movement of the lever 408 to its initial position.

For retarding the movement of the lever 408 and the turret assembly as they approach the limit of the indexing movement, a microswitch 442 initiates the operation of a retarding means hereinafter described. As shown in FIG. 4, the switch 442 has an operating arm 444 which operates by a crank motion. At its free end the arm 444 carries a roll 446 which is engaged by a cam member 448 which depresses the arm 444 to operate the microswitch. The cam member is carried by the lever 408 and is arranged to engage the roll 446 after the lever 408 has advanced through an initial increment of its indexing movement. In the event that the lever 408 and the turret organization fail to come to rest upon the completion of 30° of indexing movement, the lever engages a plunger 450 slidably mounted in a cylinder 452. The plunger 450 is carried by a piston (not shown) which acts against pressure fluid in the cylinder 452. After the fluid in the cylinder has brought the lever 408 to rest, fluid pressure is applied to the piston to inch the lever and the turret assembly back to the position in which it should have come to rest. In order to insure that the automatic movement of the work supporting assembly from the loading position to the injection position will take place only when the ambulatory assembly is accurately positioned in the injection station, the illustrated machine is provided with an overrun switch 454 (FIG. 5) which overcomes the fluid pressure operation initiated by the operation of the switch 438 and prevents the swinging movement of the ambulatory assembly until that assembly has been returned to a position of registration with the injection nozzle. The swinging movement of the mold assembly into engagement with the injection nozzle operates a microswitch 456 (FIG. 12) to initiate the rotation of an auger in the plastic injection assembly, thereby to charge the mold cavity. The operation of the switch 456 also causes the retraction of the lever 408 from its position illustrated in FIG. 4 into a position in which the truncated spherical head 410 of the lever is clear of the L-frame 90 of the ambulatory assembly in the injection station, thus permitting angular movement of the lever 408 in a clockwise direction, as seen in FIG. 4, to return it to its initial position. Such angular movement of the lever is initiated by the operation of the microswitch 432 by the pin 434 as the lever 408 comes to the limit of its longitudinal retracting movement. To this end the operation of the microswitch 432 initiates the operation of the piston in the cylinder 416 to return the lever 408 to its angular position illustrated in FIG. 4. It will be understood that upon the completion of such angular movement the lever 408 will be in its longitudinally retracted position. However, the lever remains in this position only instantaneously since, during the latter part of its angular movement to its position illustrated in FIG. 4, the lever engages and operates the microswitch 440 (FIG. 12) to cause the longitudinal movement of the lever 408 by fluid pressure from its retracted position to its advanced position illustrated in FIG. 4 in which the truncated spherical end portion 410 is positioned between the plates 412 of the L-frame 90 of the ambulatory assembly then located in the loading station. At this stage both ends of the cylinder 416 are open to exhaust, thus permitting a slight movement of the lever 408 in either direction as the head of the lever adjusts itself to a position between the wear plates 412. At this time the turret assembly is held against rotation by the engagement of the ambulatory assembly at the injection station with the injection nozzle.

When the lever 408 has advanced longitudinally to engage the ambulatory assembly in the loading station, as shown in FIG. 4, and before the ambulatory assembly in the injection station is permitted to swing away from the injection nozzle, the turret assembly is locked against indexing movement by the closing of the switch 430, thus holding the lever in the position which it has assumed by its engagement with the wear plates 412. The illustrated turret locking means 413, which is shown in FIGS. 4 and 11, comprises a vertical cylinder 458 mounted on and projecting upwardly from an extension 457 of the cover plate 428. Slidably mounted in the cylinder 458 is a plunger 460 which is urged downwardly by two springs 462 connected respectively to opposite end portions of a cross pin 464 in the bifurcated upper portion of the plunger. The cross pin 464 carries an equalizing lever 466 from opposite end portions of which depend two locking bars 468, the lower end portions of which are slidable vertically in guideways formed in the extension 457 of the cover plate 428. The lower end portions of the locking bars 468 have their inner surfaces beveled, as shown in FIG. 11, for engagement with complementally beveled surfaces of the lever 408. If the lever 408 is slightly displaced angularly from its position shown in FIG. 11, one of the locking bars will be elevated relatively to the other, but whatever the position of the lever 408 between the locking bars it will be firmly locked against angular movement by the engagement of the locking bars with the beveled surfaces of the lever under the action of the springs 462.

Upon the completion of the mold charging operation, a microswitch 282 (FIG. 12) is operated to cause the gate 284 (FIG. 2) to close the injection port, as hereinbefore described, and to arrest the operation of the mold charging means.

The downward movement of the locking bars 480 into the position illustrated in FIG. 11 closes a microswitch 472. Similarly, the closing of the gate valve 284 closes a microswitch 474 (FIG. 12). With these microswitches closed the ambulatory assembly is permitted to move angularly from its injection position, illustrated in FIG. 1, into a position in which the roll 82 engages the rail 84 and closes a switch 476. If switches 478, 480 (FIG. 8), 482 (FIG. 1) and 472 (FIG. 11) are closed to indicate respectively that the mold operating and the assembly swinging mechanisms are fully retracted and the turret locking mechanism is in its locking position and a safety switch 486 (FIG. 4) is closed, the supply of fluid from the pressure pump is connected to exhaust and the machine cycle has been completed. The safety switch 486 is operated by the movement of the ambulatory assembly from the loading station to the injection station, provided the foot form is latched in its mold closing position and the ambulatory assembly is swung outwardly with the roll 82 against the rail 84.

Referring to FIG. 12 illustrating the hydraulic organization of the machine, pressure fluid is circulated by a pump 488 through a pressure control valve 490 and a filter 492. The fluid pressure in the circuit may be determined by a spring loaded relief valve incorporated with the valve 490 or by an auxiliary pressure control valve 494 which may be connected to the valve 490 to control the pressure in the system. The valve 490, in that case, operates through a pilot valve 496.

In the operation of the machine, the operator loads a lasted shoe upper onto the shoe form 30 at the loading station, swings the shoe form upwardly into its mold closing position and latches the form in this position. He then presses a pair of push button switches (not shown) which close a circuit to a solenoid 498 which shifts the pilot valve 496 to establish a relatively low pressure in the hydraulic system depending upon the setting of the valve 494. The operation of the push button switches also energizes a solenoid 500, shifting a valve 506 into a position in which pressure fluid flows to the bottom of the cylinder 392, the upper end being connected to exhaust. The operation of the piston in the cylinder 392 closes the side mold members. Thereupon the push button switches are released by the operator, deenergizing the solenoid 500 and permitting a spring 504 to return the valve 506 to its initial position so that pressure fluid flows into the upper end portion of the cylinder 392 to retract the side mold closing mechanism, the lower portion of the cylinder then being connected to exhaust. The downward movement of the piston in the cylinder 392 having closed the microswitch 478, the ambulatory assembly is now ready to be indexed from the loading station to the injection station. It will be understood that such movement of the ambulatory assembly is predicated upon the closing of the side mold members, the retraction of the mold closing means, and the position of the ambulatory assembly in which the roll 82 is in contact with the rail 84. The indexing operation is also predicated upon the closure of two safety switches 486 and 476 hereinbefore referred to. The indexing operation is effected by the operation of a second pair of push button switches (not shown) which close a circuit to cause the operation of the solenoid 498 and a solenoid 508. The solenoid 498 determines the pressure in the system as above described, and the solenoid 508 operates a valve 510 to supply pressure fluid to the cylinder 458 in which operates the plunger 460, thus elevating the plunger and the turret locking bars 468. The upward movement of the plunger 460 operates a microswitch 512 (FIG. 11) to close a circuit through which a solenoid 514 is energized. The operation of said solenoid shifts a valve 516 into a position to cause the flow of pressure fluid to the right end of the cylinder 416, thereby swinging the lever 408 in a counterclockwise direction, as seen in FIG. 12, to advance the turret and the 12 ambulatory assemblies thereon 30°. The movement of the turret assembly accelerates until the switch 442 is operated by the cam member 448 (FIG. 4) thus to energize two solenoids 518 and 520 and deenergize the solenoid 514. The solenoid 518 shifts the valve 516 to the right, as seen in FIG. 12, while the solenoid 520 shifts a valve 522 to the right. Before the operation of the switch 442, pressure fluid from the left side of the cylinder 416 is open to exhaust through a valve 524, a non-return valve 527, the valve 516 and the valve 522, but after the valves 516 and 522 have been shifted as the result of the closing of the switch 442, the left end of the cylinder 416 is connected through the valve 524, a restriction 528 and the valve 516 to fluid pressure. The right end of the cylinder 416 is connected through the valves 516 and 522 to a pressure line having incorporated therein a restriction 530. The restriction 530 serves to retard the movement of the turret assembly by reducing the rate of flow of pressure fluid through the valve 522 to the right end of the cylinder 416. During the indexing movement exhaust fluid may be drawn into the right end portion of the cylinder 416 from the sump through a ball valve 532. When the turret assembly has been retarded to such an extent that all of the pressure fluid flowing into the right end of the cylinder 416 is supplied through the restriction 530, there is a differential between the forces on opposite sides of the piston and the cylinder 416 just sufficient to inch the turret assembly forwardly into its final position. As the turret assembly completes the indexing movement it operates the microswitch 438 to energize a solenoid 534 thereby to shift a valve 536 into a position in which the lower end portion of the cylinder 262 is connected to fluid pressure and the upper portion is open to exhaust. This initiates the swinging movement of the ambulatory assembly to bring the injection port into mating engagement with the nozzle. The operation of the switch 438 also deenergizes the solenoid 498 and energizes the solenoid 526 to shift the pilot valve 496 in order to establish high pressure in the fluid system. The ambulatory assembly is thus held in its mold charging position under the action of high fluid pressure during the mold charging operation. The swinging movement of the ambulatory assembly into its mold charging position closes the microswitch 456 which initiates the operation of the plastic injecting means. The operation of the switch 456 also deenergizes the solenoids 518 and 520 and energizes a solenoid 538. The valves 516 and 522 are thus returned to their positions, illustrated in FIG. 12, connecting both ends of the cylinder 416 to exhaust. The energizing of the solenoid 538 shifts a valve 540 to cause fluid under high pressure to flow through a restriction 542 to a cylinder 544, thereby to operate a slide 546 in which is mounted the fulcrum pin 414. The slide is moved downwardly, as seen in FIG. 12, to withdraw the indexing lever 408 from its position illustrated in FIG. 4 preparatory to the return of the lever to its initial position. Since both ends of the cylinder 416 are open to exhaust at this time, the lever 408 is free to return to its initial position. The operation of the slide 546 causes the pin 434 to close the microswitch 432 thereby to energize the solenoid 518 which shifts the valve 516 to a position in which pressure fluid flows through the restriction 528 and the valve 524 to the left end of the cylinder 416, thus swinging the lever 408 to the right, as seen in FIG. 12. As the lever 408 comes to its position illustrated in FIG. 12, it operates the switch 440 to deenergize the solenoids 518 and 538 whereupon the valve 540 is spring returned to its position illustrated in FIG. 12. Pressure fluid now flows to a cylinder 548, the cylinder 544 now being connected to exhaust. The operation of the piston in the cylinder 548 moves the slide 546 to advance the indexing lever 408 into its position illustrated in FIG. 4. Inasmuch as both ends of the cylinder 416 are now connected to exhaust, the truncated spherical end portion of the lever is free to adjust itself as required as it enters the space between the wear plates 412. The advancement of the lever 408 operates the switch 430 to deenergize the solenoid 508 thus to permit the valve 510 to be spring returned to its initial position connecting the lower end of the cylinder 458 to exhaust. The springs 462 (FIG. 11) then move the locking bars 468 downwardly to lock the lever 408 against swinging movement in order to hold the turret assembly against movement while the ambulatory assembly at the injection station swings forwardly away from the injection head into a position in which the roll 82 (FIG. 1) engages the rail 84. The downward movement of the locking bars opens the normally closed safety switch 472.

The charging of the mold cavity terminates after the cavity has been completely filled and sufficient pressure has been applied to the fluid plastic at the toe end of the cavity to operate the spring-pressed plunger 274 (FIG. 3). The plunger operates a microswitch 282 thereby to energize the solenoid 310 which operates the trip lever 312. Referring to FIG. 2, the trip level disengages the latch arm 292 to permit the spring 288 to close the gate valve 284. The operation of the microswitch 282 also causes the operation of a clutch which terminates the operation of the plastic injection means. Upon the closing of the gate valve 284 the ambulatory assembly at the injection station swings from its mold charging position into its position illustrated in FIG. 1 in which the roll 82 engages the rail 84. Such movement of the ambulatory assembly closes the switch 476, thereby closing a circuit through the switches 478, 486, 480, 482 and 472 to prepare the system for the next indexing operation.

If, during the indexing operation, the turret assembly and the lever 408 overrun the normal 30° indexing movement, the lever engages the plunger 450 (FIG. 5) in the cylinder 452, which is connected by a ball valve 550 to the pressure side of the system so that the cylinder 452 is pressurized and the plunger 450 is fully advanced. If the lever 408 strikes the plunger, pressure fluid flows from the cylinder 452 through a spring loaded ball valve 552. After the turret assembly has come to rest, pressure fluid, flowing through the ball valve 550, acts on the plunger 450 to return the lever and the turret assembly to the position which it should occupy upon the completion of the indexing movement. The return of the lever 408 from its overrun position to its normal indexing position is effected by an inching movement brought about by the flow of pressure fluid into the cylinder 452 by way of the restriction 530. This pressure line is also connected at this time to the right end portion of the cylinder 416 but inasmuch as the diameter of the head of the plunger 450 in the cylinder 452 is greater than the diameter of the piston in the cylinder 416 the differential of the two forces causes the advancement of the plunger 450 to return the lever 408 to its normal indexing position. The movement of the lever 408 from its overrun position to its normal indexing position causes the opening of the switch 454 (FIG. 5) and operates the microswitch 438 to initiate the swinging movement of the ambulatory assembly into a position in which the injection port is in mating engagement with the nozzle.

For test purposes, it will sometimes be desirable to move the ambulatory assembly into its mold charging position without initiating the operation of the plastic injecting means. To this end, a switch 554 (FIG. 3) is secured to a bracket 556 fixed to the rail 84 at the injection station. For operating the switch, an arm 558 depends therefrom. When the ambulatory assembly is swung into its mold charging position, the arm 558 is normally engaged and swung in a counterclockwise direction, as seen in FIG. 3, by a striker member 560 carried by the mold assembly. The striker member is secured to a shaft 562 journaled in suitable bearings in a bracket 564 fixed to the plate 102. Also secured to the shaft 562 is a hand lever 566. A spring 568 normally holds the hand lever and the striker member 560 in their positions illustrated in FIG. 3, in which position the striker member is arranged to operate the arm 558. This position of the hand lever is determined by the engagement of its lower end portion with the bracket 564. If it is desired to prevent the operation of the plastic injecting means when the ambulatory assembly is swung into its mold charging position, the hand lever 566 is swung downwardly into a position in which the spring 568 is at the opposite side of the shaft 562, thus holding the striker member 560 in a position in which it will not contact the arm 558. In this situation, the ambulatory assembly is advanced into the mold charging position by the operation of a third pair of operator-actuated push button switches.

In the event of a power failure, when the lever 408 and the turret assembly are moving at accelerated speed, their movement is arrested by the cooperation of a spring pressed ball valve 570 with the valve 524. Power failure deenergizes the solenoid 572 and causes the valve 524 to be shifted by the spring 574 so that pressure fluid flows from the left end portion of the cylinder 416 to exhaust through the spring loaded ball valve which exerts a suitable decelerating action on the lever 408 and the turret assembly.

Having thus described my invention, what I claim as new and desire to secure by Letters Patent of the United States is:

1. A plastic injection molding machine having, in combination, a turret comprising a table and a plurality of ambulatory assemblies mounted thereon, means for indexing the turret comprising an actuator, a pressure fluid operated piston for imparting indexing movement to the actuator, means comprising a plunger connected to a relief valve for arresting the actuator in the event of an overthrow of the turret, and a line through which pressure fluid is conducted to the plunger to effect a reverse movement of the indexing assembly while fluid pressure is maintained against the piston thereby to throttle the pressure fluid operation of the plunger thus to cause an inching movement of the turret from its overrun position back to its station position.

2. A plastic injection sole molding machine having, in combination, a turret comprising an annular table mounted for rotation about a fixed axis, plastic injecting means surrounded by the table, a plurality of ambulatory assemblies mounted on the table, each assembly comprising a pair of side mold members, a sole mold member and a work support movable relatively to the mold members to effect the closure of the mold cavity, a sprue clearer positioned adjacent to the sole mold member, and means operated by the rotation of the turret for moving the sprue clearer into a position such that the sprue carried thereby is discharged by gravity.

3. A plastic injection sole molding machine having, in combination, a turret comprising an annular table mounted for rotation about a fixed axis, plastic injecting means including an injection nozzle surrounded by the table, a plurality of ambulatory assemblies mounted on the table, each assembly comprising a pair of side mold members, a sole mold member and a work support movable relatively to the mold members to effect the closure of the mold cavity, a sprue clearer incorporated in the ambulatory assembly and positioned between the injection nozzle and the sole mold member when the ambulatory assembly is in the injection station, and means operated by the rotation of the turret during the movement of the ambulatory assembly away from the injection station for moving the sprue clearer into a position offset from the sole mold member in order to permit sprue to drop from the clearer into a suitable receptacle.

4. A plastic injection molding maching having in combination a turret comprising a table and a plurality of ambulatory assemblies mounted thereon, each ambulatory assembly comprising a pair of side mold members, a sole mold member and a work support movable relatively to the mold members to effect the closure of the mold cavity, a sprue clearer positioned adjacent to the sole mold member, means operated by the rotation of the turret for moving the sprue clearer into a position such that the sprue carried thereby is discharged by gravity, means for indexing the turret comprising an actuator, a pressure fluid operated piston for imparting indexing movement to the actuator, means comprising a plunger connected to a relief valve for arresting the actuator in the event of an overthrow of the turret, and a line through which pressure fluid is conducted to the plunger to effect a reverse movement of the turret while fluid pressure is maintained against the piston thereby to throttle the pressure fluid operation of the plunger.

References Cited in the file of this patent

UNITED STATES PATENTS

| | | |
|---|---|---|
| 1,958,422 | Dinzl | May 15, 1934 |
| 2,011,486 | Kingsbury | Aug. 13, 1935 |
| 2,333,056 | Thoreson | Oct. 26, 1943 |
| 2,431,843 | Swoger | Dec. 2, 1947 |
| 2,732,584 | Bishop | Jan. 31, 1956 |
| 2,862,232 | Rekettye | Dec. 2, 1958 |
| 2,937,405 | Berggren | May 24, 1960 |

FOREIGN PATENTS

| | | |
|---|---|---|
| 216,208 | Australia | Dec. 6, 1956 |

OTHER REFERENCES

"General-Purpose Extrusion Molding Machine," British Plastics, December 1956, pp. 442–443.